United States Patent [19]

Bird

[11] 4,034,940
[45] July 12, 1977

[54] PARACHUTE CONTAINERS

[75] Inventor: Jerry Bird, Orange, Mass.

[73] Assignee: Parachutes Incorporated, Orange, Mass.

[21] Appl. No.: 477,007

[22] Filed: June 6, 1974

[51] Int. Cl.$^2$ .................................. B64D 17/46
[52] U.S. Cl. ............................ 244/148; 244/149
[58] Field of Search ......... 244/148, 147, 149, 142; 24/DIG. 18, 204

[56] References Cited

U.S. PATENT DOCUMENTS

| 2,318,673 | 5/1943 | Coleman | 244/148 |
|---|---|---|---|
| 2,495,341 | 1/1950 | Moran | 244/148 |
| 2,508,754 | 5/1950 | Frieder et al. | 244/148 |
| 2,537,152 | 1/1951 | Moran | 244/148 |
| 2,765,132 | 10/1956 | Oakley | 244/142 |
| 2,765,995 | 10/1956 | Kowalski | 244/148 |
| 2,978,212 | 4/1961 | Istel et al. | 244/148 |
| 2,979,294 | 4/1961 | Buss | 244/148 |
| 2,981,505 | 4/1961 | Oakley | 244/149 |
| 2,998,950 | 9/1961 | Fritz et al. | 244/148 |
| 3,009,566 | 11/1961 | Oakley | 244/148 UX |
| 3,087,696 | 4/1963 | Sepp | 244/148 |
| 3,437,295 | 4/1969 | Istel et al. | 244/148 |
| 3,540,684 | 11/1970 | Snyder | 244/149 |
| 3,690,604 | 9/1972 | Guilfoyle | 244/148 |
| 3,703,268 | 11/1972 | Pravaz | 244/148 |
| 3,963,199 | 6/1976 | Pravaz | 244/148 |

FOREIGN PATENT DOCUMENTS

| 232,973 | 2/1961 | Australia | 244/147 |
|---|---|---|---|
| 1,037,970 | 8/1966 | United Kingdom | |

Primary Examiner—Trygve M. Blix
Assistant Examiner—Galen L. Barefoot
Attorney, Agent, or Firm—Fitzpatrick, Cella, Harper & Scinto

[57] ABSTRACT

Parachute containers formed of a central panel and overlapping flaps which are held together by pull apart intergripping fastening arrangement. The fastening arrangement is constructed such that it releases in response to pulling in a flap opening direction so that the flaps are automatically opened by the action of releasing the fastening arrangement thereby eliminating the need for elastic straps, springs etc.

8 Claims, 12 Drawing Figures

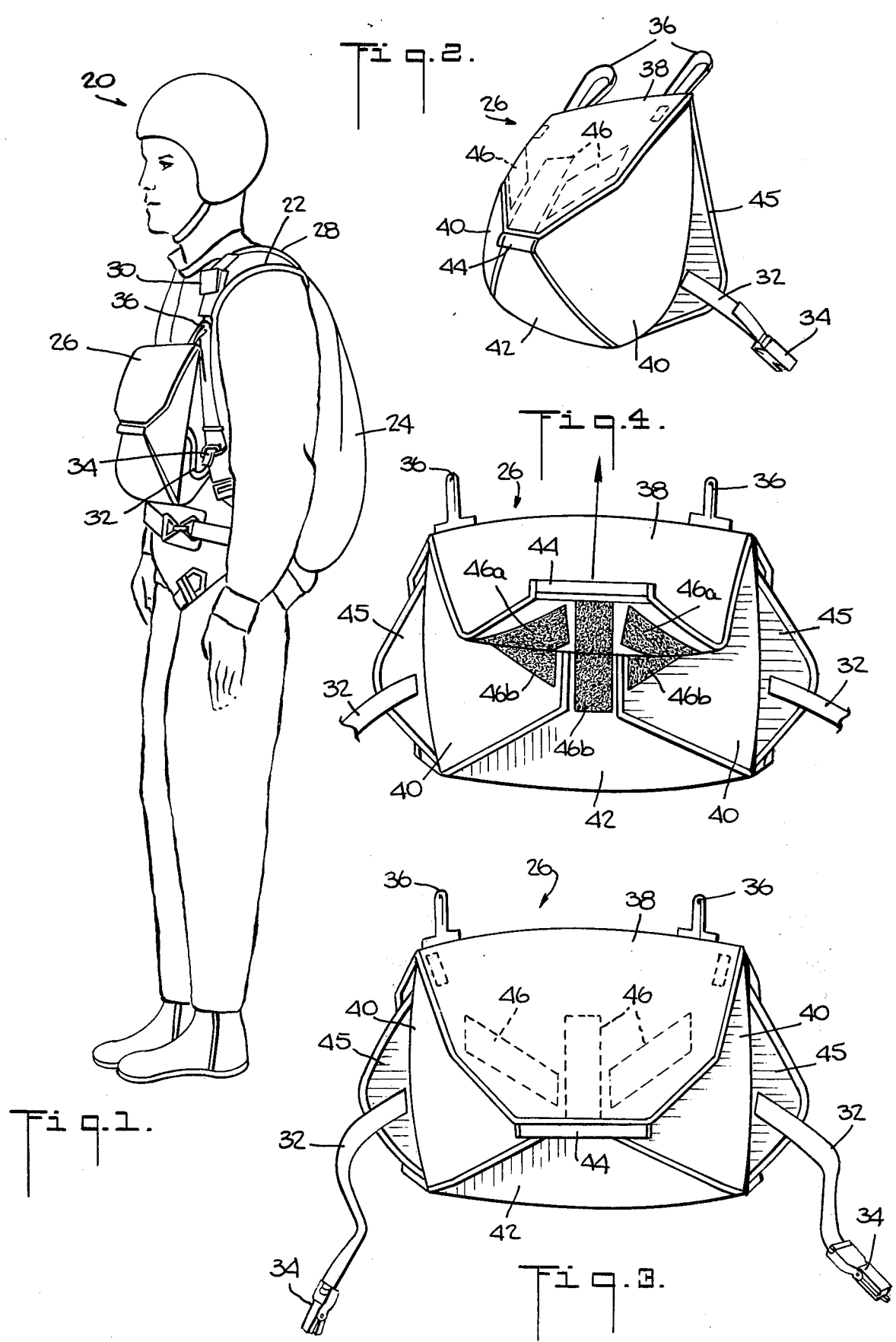

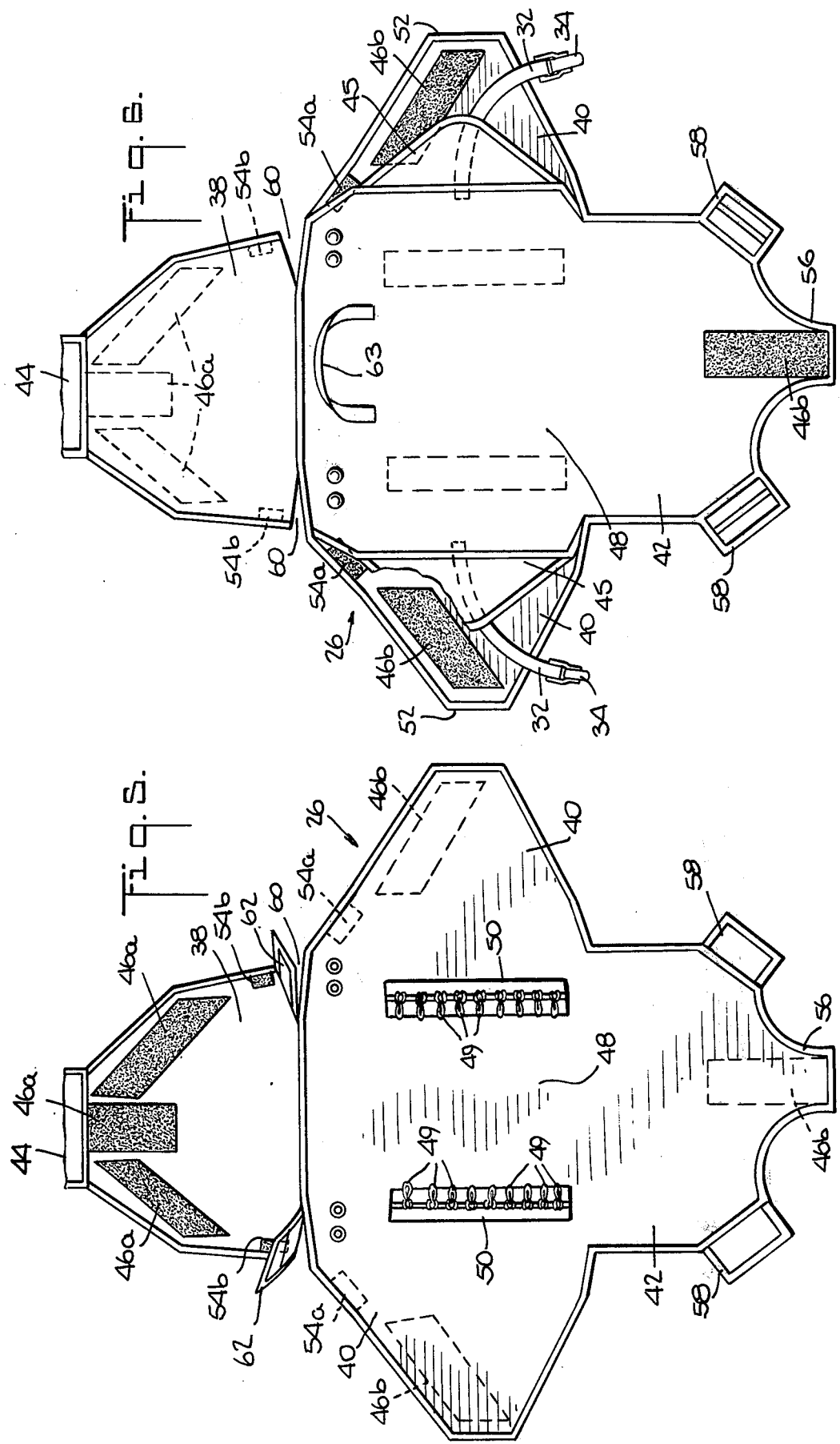

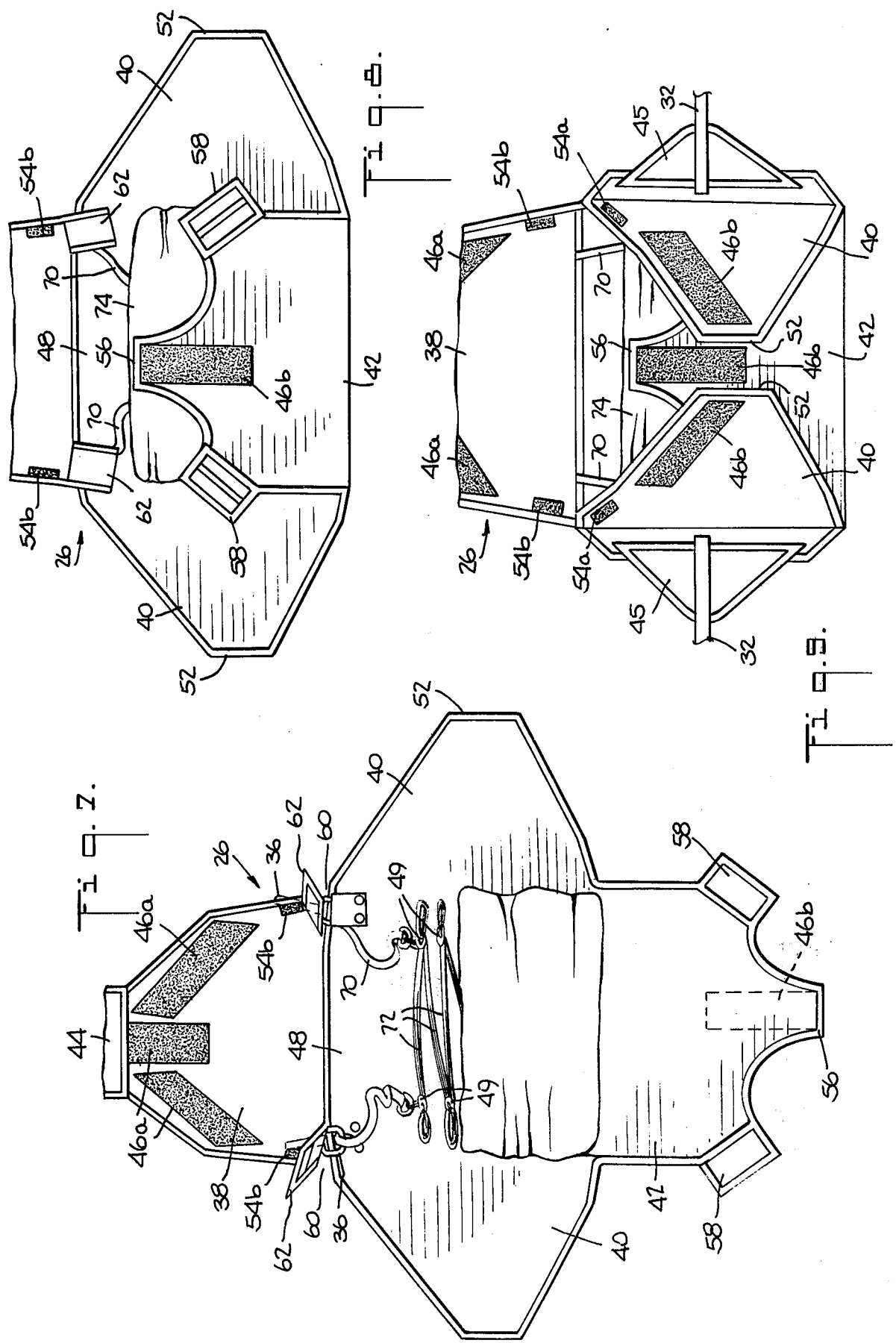

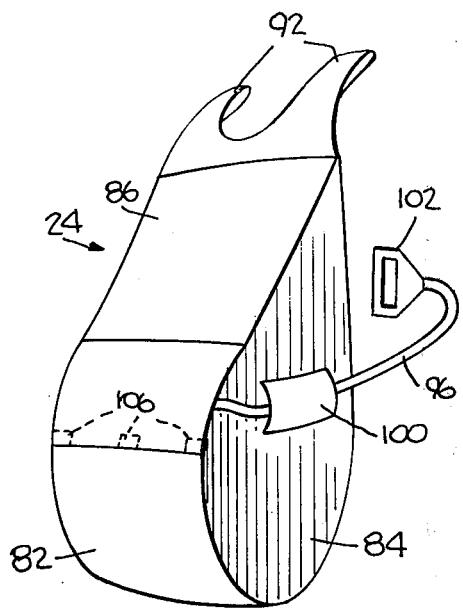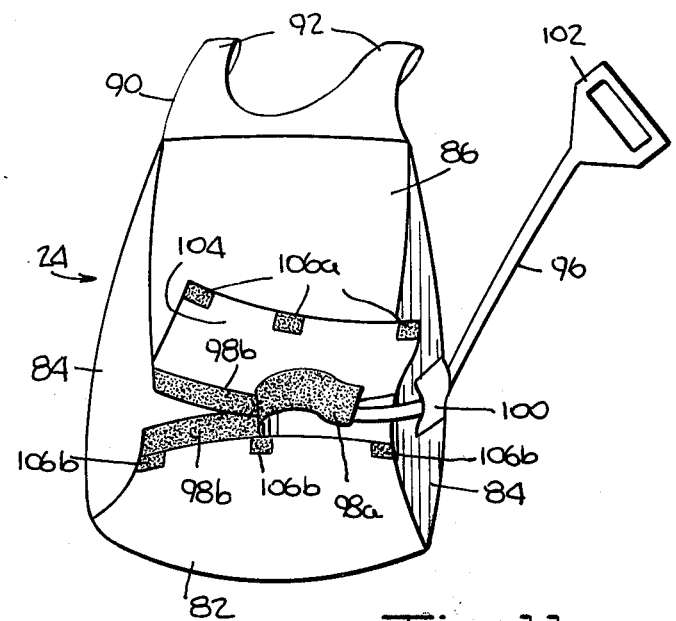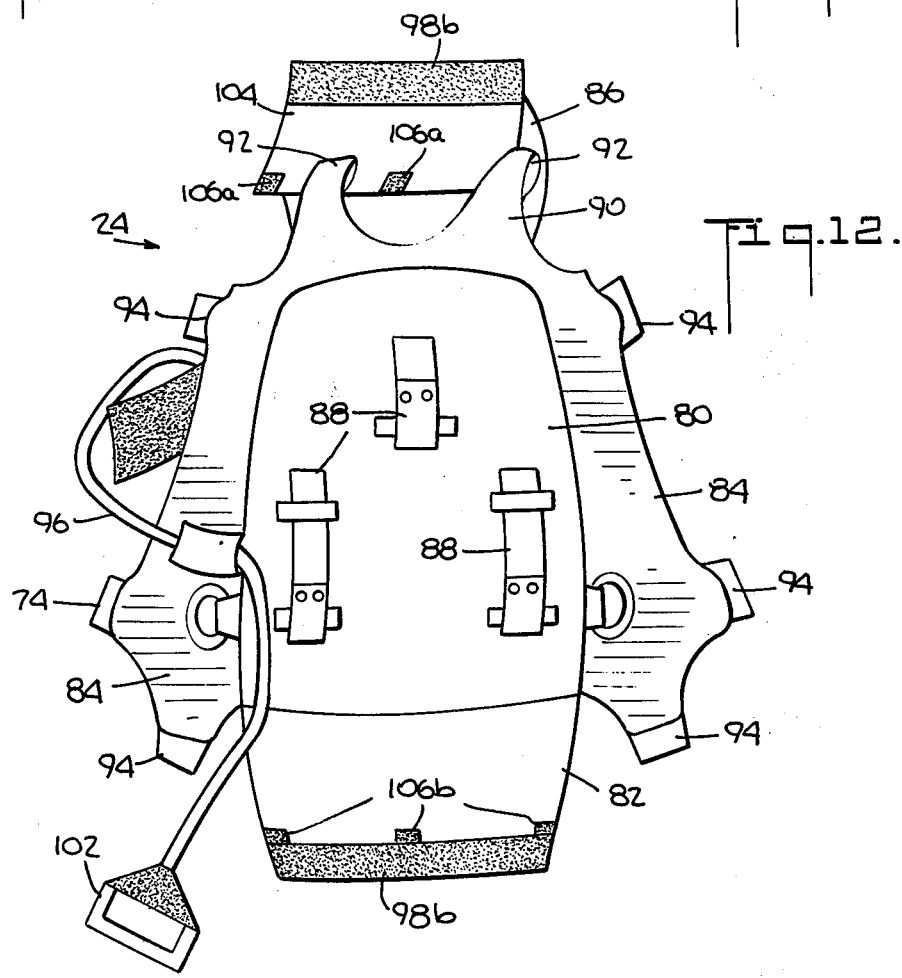

PARACHUTE CONTAINERS

BACKGROUND OF THE INVENTION

1. Field of the Invention

This invention relates to parachuting equipment and more particularly it concerns novel parachute containers characterized by light weight, aerodynamic shape and ease of operation. In its different aspects the present invention provides improved containers for both reserve parachutes, which, prior to deployment, are worn on the front of the body, and main parachutes, which, prior to deployment are worn on the back of the body.

2. Description of the Prior Art

U.S. Pat. No. 2,998,950 to Fritz et al. describes an integrated parachute deployment bag and outer pack. The device is made up of a plurality of flaps which are folded over a parachute canopy and secured in place. This device however does not lend itself to deployment except by means of a static line attached to an aircraft; and therefore it is not suitable for the free fall aspects of sport parachuting. Also the device of the Fritz et al. patent is not of aerodynamic shape; but instead is generally rectangular.

Other prior art includes conventional reserve parachute containers constructed of several flaps which are overlapped around a folded parachute canopy and secured by means of cones and grommets with ripcord controlled pins passing through holes in the cones. These known reserve parachute containers, however, must be provided with tensioned elastic straps along each flap so that when the pins are released from the cones the straps will pull each of the flaps back to uncover the parachute canopy. In order to withstand the pulling action of the elastic straps the container is provided with a metal frame. This frame, besides adding excess weight to the device, prevents the container from assuming an aerodynamic shape and conforming itself to the body of the user.

SUMMARY OF THE INVENTION

The present invention provides a novel parachute pack and container which is light in weight, and aerodynamic shape. This device moreover does not require metal frames, elastic straps or static line acutation; and yet it provides reliable and complete opening for safe deployment of a parachute canopy.

The novel parachute container of the present invention is made up of a unitary piece of flexible sheet material formed with a central back panel, a bottom flap, a pair of side flaps and a top flap. Suspension line stowage elements are formed inside the back panel. The bottom, side and top flaps are foldable over each other in front of the back panel to form a closed container enclosing a folded parachute canopy. Special pull-apart fastening means are provided to hold the flaps in their overlapped condition. These fastening means, which are preferably a conbination of hooked plastic bristles and looped or matted fabric, sold under the trademark Velcro, resist pulling forces in the plane of the flaps for releasing them from each other.

Because of the above described flap and fastening means arrangement, the parachute canopy is held securely in place, yet by pulling on the outermost flap in a direction transverse to its plane, not only are the flaps released from each other but all of the flaps are at the same time pulled to an opened condition so that the canopy is automatically and fully released from the container. In addition, the automatic flap opening feature of the present invention eliminates the need for tensioned elastic straps and metal frames. Accordingly the container may be designed so that on one side it conforms to the body of the wearer and on the other side it assumes a streamlined or aerodynamic shape suitable for free fall flight.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

Various embodiments of the invention have been chosen for purposes of illustration and description, and are shown in the accompanying drawings, forming a part of the specification, wherein:

FIG. 1 is a sketch of a parachutist wearing a main parachute container and a reserve parachute container in each of which the present invention is embodied;

FIG. 2 is a perspective view of the reserve parachute container of FIG. 1;

FIG. 3 is a front view of the reserve parachute container of FIG. 2;

FIG. 4 is a view similar to FIG. 3 but showing the reserve parachute container in partially opened condition;

FIG. 5 is an inside view of the reserve parachute container of FIGS. 2–4 in fully opened condition;

FIG. 6 is an outside view of the fully opened reserve parachute container of FIG. 5;

FIG. 7 is a view similar to FIG. 5 but showing a partially stowed reserve parachute in the container;

FIG. 8 is a view similar to FIG. 7 but showing a partial closing of the reserve parachute container;

FIG. 9 is a view similar to FIG. 8 but showing a further closing of the reserve parachute container;

FIG. 10 is a perspective view of the main parachute container of FIG. 1;

FIG. 11 is a back view of the container of FIG. 10, in partially opened condition; and FIG. 12 is an outside view of the container FIG. 11 in fully opened condition.

As shown in FIG. 1, a parachutist 20 is outfitted with a body harness 22 to which is secured a main parachute container 24 on the back of the parachutist, and a reserve parachute container 26 on the front of the parachutist. A main parachute (not shown) is stowed within the main parachute container 24. This main parachute includes risers 28 which extend out from the container 24 and which are secured to the harness 22 by means of buckles 30 near the shoulders of the parachutist 20. The main parachute container 24 itself is provided with loops and buckles (to be described hereinafter) for attaching it to the harness 22.

The reserve parachute container 26 is provided with side straps 32 and buckles 34 for securing the container 26 to the harness 22. A reserve parachute (not shown) is stowed within the reserve parachute container 26. The reserve parachute also includes risers (not shown) which are secured by clips 36 to the harness 22.

As shown in FIGS. 2 and 3, the reserve parachute container 26 is of generally bag-like configuration. The container, which is made of flexible sheet material such as nylon, includes a top flap 38, a pair of side flaps 40 and a bottom flap 42. These flaps overlap each other and are secured together to form a closed container. As can be seen, the bottom flap 42 is folded up first, and then the side flaps 40 are folded over the bottom flap. Finally the top flap 38 is folded down over the other flaps. The lower edge of the top flap is provided with a roll hem 44 which may be easily grasped in the hand and pulled upwardly for opening the container. A pair of wing flaps 45 are sewn to the rear edges of the side flaps 40; and the side straps 32 are connected to these wing flaps. The wing flaps 45 serve to stabilize the container 26 to the body of the wearer.

Turning now to FIG. 4, it will be seen that the reserve parachute container 26 is opened by pulling up on the roll hem 44 to lift the top flap 38 up off the other flaps. It will also be seen that the two side flaps 40 do not overlap each other but instead they terminate to expose between their edges a portion of the bottom flap 42. With this arrangement, the top flap 38 in closed condition overlies and makes contact with the bottom flap 42 and each of the side flaps 40. Also shown in FIG. 4 are separate pull apart fastening means for directly fastening the top flap to the bottom flap and to each of the side flaps. This pull apart fastening means comprises cooperating strips 46a and 46b of fastener material on the mutually overlapping regions of the top flap with the side and bottom flaps. Thus the top flap 38 is provided with three of the strips 46a while the side flaps 40 and the bottom flap 38 are each provided with one of the cooperating strips 46b. These pull apart fastening strips 46a and 46b, when pressed together, secure the overlapping flaps to each other and they provide a very substantial resistance to relative flap movement in their respective planes. However the fastener means may be released by pulling in an outward direction, i.e. transverse to the flaps, as shown in FIG. 4. Because of this outward pull, not only are the fastening means released, but in addition there is simultaneously provided an outward pull on all the flaps so that with the same pulling motion they are all brought to an unfolded or opened condition for complete release of the parachute canopy.

The particular fastening strips used in the present embodiment comprise a hook and loop arrangement whereby one of the cooperating strips 46a is formed with a brushlike surface of hooked or barbed plastic bristles while the other strip 46b is formed with a loop or matted fabric and provide very strong resistance to pulling in the plane of the strips; however when the strips are pulled apart in a direction transverse to their planes the resistance to pulling is considerably decreased. Strips which exhibit these characteristics are sold commercially under the trademark Velcro.

Turning now to FIGS. 5 and 6, it will be seen that the top flap 38, the side flaps 40 and the bottom flap 42 are all integral with and extend, respectively, from the edges of a generally rectangular central back panel 48. A pair of suspension line storage strips 50 are sewn in parallel relationship to the inside surface of the back panel 48; and a plurality of rubber band stowage loops 49 are secured to the strips 50.

The side flaps 40, as shown, are generally triangular in configuraion although they have truncated apexes 52. As shown in FIG. 6, strips 46a on the side flaps extend on the outside surface thereof along the triangular edges closest to the top flap 38 as well as along their truncated apexes. Smaller fastener strips 54a are arranged along the edge of the side flaps near the top flap 38. The bottom flap 42 is generally rectangular; however it has a central tab like projection 56 near the center of its outer edge. When the flaps are folded over to form a container, the tab like projection 56 of the bottom flap 42 lies between the truncated apexes 52 of the side flaps 40. The bottom flap 42 is also provided with a pair of pocket tabs 58 sewn to its lower corners on opposite sides of the projection 56. These pocket tabs can be engaged by a stick or a "fid" which is used to push up on the bottom flap 42 inside the top and side flaps for tightly closing the container during packing.

The top flap 38 is secured to the back panel only in its central region so that slit like openings 60 remain near the edges of the top flap. These openings allow passage of the reserve parachute risers so that they can be buckled to the harness 22 of the parachutist (FIG. 1). A pair of further pocket tabs 62 are sewn to the top flap 38 along the slit like openings 60 also to permit fid engagement to assist in packing the container. A pair of cooperative fastener strips 54b are mounted on the inside surface of the top flap 38 to engage the strips 54 when the container is closed. This provides a secure, though openable closure around the riser openings formed by the slit like openings 60. Also, a carrying handle 63 is secured to the outer surface of the central panel 48.

As shown in FIG. 7, the above described container is packed by bringing parachute risers 70 in through the slit like openings 60 and then stowing suspension lines 72, attached to the risers, by looping them back and forth through the stowage loops 49. A parachute canopy 74 attached to the opposite ends of the suspension lines 70 is then pleated and folded neatly over the back panel 48.

After the parachute has been folded as above described the container is closed over it as shown in FIGS. 8 and 9. As can be seen in FIG. 8, the bottom flap 42 is first pulled up around the bottom and front of the parachute. Thereafter, as shown in FIG. 9, the side flaps 40 are brought around over top of the bottom panel. The top panel 38 is then brought down over the other panels and the various fasteners strips 46a, 46b and 54a, 54b are secured to each other. The now packed container is then ready for connection to the parachute harness 22 (FIG. 1).

In operation, the packed container is worn on the front of the parachute as illustrated in FIG. 1. After the parachutist has exited from an aircraft he begins the free fall portion of his descent. During this free fall it is important that the aerodynamic configuration of the parachutist, including all equipment secured to him, be such as to provide minimal interference with air flow around him. This then allows the parachutist to control the direction and speed of his descent simply by changing his body configuration, i.e. by extending and retracting his limbs and by bending and straightening his body. Because the reserve parachute container fits closely against the body of the parachutist and because the container has an external tapered shape, it presents only minimal interference with the flow of air and therefore allows maximum control of speed and direction of free fall.

Upon completion of the free fall portion of descent the parachutist normally actuates his main parachute container to deploy the main canopy. In the event of a malfunction however it may be necessary to deploy the reserve parachute. This is done by grasping the roll hem 44 and pulling upwardly and outwardly on it. Since this pull is generally transverse to the plane of the overlapping flaps it allows release of the fastening means. At the same time however, the pulling action is communicated through the fastening means to the underlying flaps and pulls them open also. Thus with one pulling motion not only are the fastening means released but the flaps are all pulled outwardly so that the reserve parachute canopy is fully released for complete and reliable deployment.

FIGS. 10-12 show the structural features of the main parachute container 24. As can be seen in the fully opened view of FIG. 12, this container includes a central back panel 80, a bottom flap 82, a pair of side flaps 84 and a top flap 86. These flaps and panel are arranged in a manner similar to the preceeding embodiment; however their size and shape is somewhat different in order to accomodate a larger main parachute.

The back panel 80, as shown in FIG. 12, is provided with connector elements 88 for maintaining it to the back portion of the harness 22 (FIG. 1). Also a top web 90 with loops 92 extends up from the back panel 80 to provide means for securing the upper region of the container to the shoulder portion of the harness 22. The side flaps 84 are provided with various pocket tabs 94 for assistance in packing.

The parachute container of FIGS. 10-12 differs from conventional main parachute containers in that it opens along a horizontal line i.e. across the back, rather than vertically. This can be seen in FIG. 11 wherein a ripcord 96 is shown to be connected to one end to a fastener strip 98a which extends horizontally across the container. This fastener strip releasably attaches to and holds together cooperating fastener strips 98b on the top and bottom flaps 82 and 86. As in the preceeding embodiment, these fastener strips may be of the Velcro type. The ripcord 96 extends around the side of the container and is guided in a loop 100.

In operating the ripcord to open the container the parachutist pulls on a handle 102 attached to the ripcord and thereby pulls the ripcord around his side. This causes the fastener strip 98a to peel off the cooperating fastener strips 98b on the top and bottom flaps 82 and 86, as shown in FIG. 11, to release the flaps. In addition to releasing the flaps, the pulling action of the fastener strip 98a pulls up on the top and bottom flaps 82 and 86 to provide a positive opening action without need for elastic strips on other spring like elements.

As shown in FIGS. 10 and 11 there is also provided a protective cover flap 104 on the back panel 80 which extends over the fastener strips 98a and 98b and which itself may be lightly held in place by means of smaller though similar fastener strips 106a and 106b.

It will be appreciated that in each embodiment there is no need for springs or other elastic mechanism to pull back the various flaps to open the parachute container. Consequently the container may be light in weight and inexpensive to manufacture. Moreover the packed container, as can be seen, is compact and adaptable to fit closely to the body of the parachutist prior to deployment. Also the outer configuration of the packed container is of teardrop shape so as to provide good aerodynamic characteristics. This is particularly advantageous for maintaining body control during the free fall phase of a sport parachuting descent.

What is claimed and desired to be secured by Letters Patent is:

1. A parachute container comprising a single unitary piece of flexible sheet material formed with a generally rectangular centrally located back panel, a bottom flap extending downwardly from a bottom edge of the back panel, a pair of side flaps extending outwardly from opposite side edges of the back panel, a top flap extending up from the remaining top edge of said back panel, said back panel being provided with rows of parachute suspension line storage elements, said bottom, side and top flaps being foldable over the back panel in mutually overlapping relationship to form a closed container with said top flap overlying said bottom and side flaps, said bottom and side flaps being otherwise unconnected to each other, fasteners attached to said container for securing said container to a parachute harness, separate reusable pull apart fastening means for separately, directly and independently interconnecting said top flap to each of said side flaps and to said bottom flap in their overlapped condition, said pull apart fastening means maintaining positive fastening of adjacent flaps against pulling forces in the planes of said overlapped flaps and operating in response to connecting and disconnecting forces applied transversely to the planes of said overlapped flaps for connecting the flaps to each other and for releasing the flaps from each other, respectively, and a flap pulling member connected to the top flap for pulling outwardly on said top flap to open said container, whereby such outward pulling simultaneously releases said fastening means and opens said flaps outwardly without need for resilient flap pulling elements on said container.

2. A parachute container according to claim 1 wherein said side flaps are generally triangular in shape and have truncated apexes.

3. A parachute container according to claim 2 wherein the bottom flap includes a central tab-like projection extending centrally of its outer edges and which, when the flaps are overlapped, extends up between said truncated apexes and wherein a portion of said fastening means is formed on said projection.

4. A parachute container according to claim 1 wherein said pull apart fastening means comprises a hook and loop arrangement wherein there is formed on one flap barbed plastic bristles and, on a mating portion of another flap, a looped fabric.

5. A parachute container according to claim 1 wherein said top flap is secured to said back panel only in its central region to provide slit like openings toward its side edges for exit of parachute risers.

6. A parachute container according to claim 5 wherein pull apart fastening means are formed on said top and side flaps in regions adjacent the outer edges of said slit like openings.

7. A parachute container according to claim 1 wherein said flap pulling member is a hand grip formed along the outer edge of the top flap.

8. A parachute container comprising a single unitary piece of flexible sheet material formed with a generally rectangular centrally located back panel, a bottom flap extending downwardly from a bottom edge of the back panel, a pair of side flaps extending outwardly from opposite side edges of the back panel, a top flap extending up from the remaining top edge of said back panel, said back panel being provided with rows of parachute suspension line stowage elements, said bottom, side and top flaps being foldable over the back panel in mutually overlapping relationship to form a closed container, said bottom and side flaps being otherwise unconnected to each other, fasteners attached to said container for securing said container to a parachute harness, pull apart fastening means for separately, directly and independently interconnecting said top flap to each of said side flaps and to said bottom flap in their overlapped condition, said pull apart fastening means being of a construction to maintain positive fastening of adjacent flaps against pulling forces in the planes of said flaps and to respond to forces transverse to the planes of said flaps for releasing the flaps from each other and a flap pulling member connected to the outermost of said flaps in their overlapped condition, for pulling outwardly on said outermost flap to open said container, whereby such outward pulling simultaneously releases said fastening means and opens said flaps outwardly without need for resilient flap pulling elements on said container and wherein said flap pulling member on said container is a rolled hem hand grip formed along the outer edge of the outermost of said overlapped flaps.

* * * * *